United States Patent
Jiang et al.

(10) Patent No.: US 10,469,820 B2
(45) Date of Patent: Nov. 5, 2019

(54) STREAMING VOLUMETRIC VIDEO FOR SIX DEGREES OF FREEDOM VIRTUAL REALITY

(71) Applicant: HypeVR, San Diego, CA (US)

(72) Inventors: Caoyang Jiang, San Diego, CA (US); Jiang Lan, San Diego, CA (US); Jason Juang, San Diego, CA (US); Anthony Tran, San Diego, CA (US)

(73) Assignee: HypeVR, San Diego, CA (US)

( * ) Notice: Subject to any disclaimer, the term of this patent is extended or adjusted under 35 U.S.C. 154(b) by 34 days.

(21) Appl. No.: 15/718,483

(22) Filed: Sep. 28, 2017

(65) Prior Publication Data

US 2018/0091791 A1 Mar. 29, 2018

Related U.S. Application Data

(60) Provisional application No. 62/401,754, filed on Sep. 29, 2016.

(51) Int. Cl.
| | |
|---|---|
| *H04N 13/117* | (2018.01) |
| *B24B 23/02* | (2006.01) |
| *E04H 4/16* | (2006.01) |
| *F03B 3/18* | (2006.01) |
| *F03B 15/06* | (2006.01) |

(Continued)

(52) U.S. Cl.
CPC ......... *H04N 13/117* (2018.05); *B24B 23/026* (2013.01); *E04H 4/1618* (2013.01); *F03B 3/18* (2013.01); *F03B 15/06* (2013.01); *H04N 13/178* (2018.05); *H04N 13/194* (2018.05); *H04N 13/388* (2018.05); *H04N 21/23439* (2013.01); *H04N 21/2402* (2013.01); *H04N 21/6587* (2013.01); *H04N 21/816* (2013.01); *F03B 3/02* (2013.01); *F03B 3/06* (2013.01); *F05B 2220/70* (2013.01); *H04N 13/161* (2018.05); *H04N 13/373* (2018.05); *H04N 13/376* (2018.05); *H04N 13/378* (2018.05); *H04N 13/38* (2018.05)

(58) Field of Classification Search
CPC ........ H04N 13/378; H04N 7/18; G06F 3/048; G06F 3/01
See application file for complete search history.

(56) References Cited

U.S. PATENT DOCUMENTS

| | | |
|---|---|---|
| 2015/0187333 A1 | 7/2015 | Loeffler et al. |
| 2016/0252955 A1 | 9/2016 | Yamamoto et al. |

(Continued)

OTHER PUBLICATIONS

World Intellectual Property Organization, International Search Report and Written Opinion for International Application No. PCT/US2017/054007, dated Dec. 15, 2017, 8 total pages.

*Primary Examiner* — Tracy Y. Li
(74) *Attorney, Agent, or Firm* — SoCal IP Law Group LLP; Jonathan Pearce

(57) ABSTRACT

There is disclosed a system and method for streaming of volumetric three-dimensional video content. The system includes a separate rendering server and display device such that the rendering server receives pose and motion data from the mobile device and generates completed frames of video for the mobile device. The frames of video are transmitted to the mobile device for display. Predictive algorithms enable the rendering server to predict display device pose from frame-to-frame to thereby reduce overall latency in communications between the rendering server and display device.

17 Claims, 5 Drawing Sheets

(51) Int. Cl.

| | |
|---|---|
| *H04N 13/178* | (2018.01) |
| *H04N 13/194* | (2018.01) |
| *H04N 13/388* | (2018.01) |
| *H04N 21/2343* | (2011.01) |
| *H04N 21/24* | (2011.01) |
| *H04N 21/6587* | (2011.01) |
| *H04N 21/81* | (2011.01) |
| *F03B 3/02* | (2006.01) |
| *F03B 3/06* | (2006.01) |
| *H04N 13/376* | (2018.01) |
| *H04N 13/378* | (2018.01) |
| *H04N 13/161* | (2018.01) |
| *H04N 13/38* | (2018.01) |
| *H04N 13/373* | (2018.01) |

(56) References Cited

U.S. PATENT DOCUMENTS

| | | | |
|---|---|---|---|
| 2016/0260251 A1 | 9/2016 | Stafford et al. | |
| 2017/0083084 A1* | 3/2017 | Tatsuta | G06F 3/048 |
| 2017/0295446 A1* | 10/2017 | Thagadur Shivappa | H04S 7/304 |
| 2018/0047332 A1* | 2/2018 | Kuwahara | G06F 3/147 |

* cited by examiner

US 10,469,820 B2

STREAMING VOLUMETRIC VIDEO FOR SIX DEGREES OF FREEDOM VIRTUAL REALITY

RELATED APPLICATION INFORMATION

This patent claims priority from U.S. provisional patent application No. 62/401,754 filed Sep. 29, 2016 and entitled "Streaming of Six Degree of Freedom Video Content."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to volumetric video and more-particularly the streaming of volumetric three-dimensional video.

Description of the Related Art

Digital video has been transmitted or streamed in various forms for many tens of years. Broadcast television transmitted video to receiving television sets using antenna and analog radio frequency signals. The amount of data was relatively limited by modern standards and generally was uncompressed.

With the advent of so-called "high-definition" television, broadcasting standards were modernized to encapsulate transmissions for more efficient usage of the available bandwidth and to provide functionality such as error correction that can, effectively, reproduce large portions of a preceding or succeeding frame of video based upon data encoded within another, nearby frame.

More recently, services such as Netflix® and YouTube® have enabled the streaming of higher and higher quality video. This technology relies upon error correction, clever compression algorithms, and only encoding differences from prior frames of video with the use of key frames to mark large transitions. As a result, extremely high resolution video (e.g. so-called 4K video) may now be transmitted over typical residential internet services with bandwidths of approximately 5 mb/s or more.

And, other video services such as Apple®'s Facetime® or Skype® stream video chat in real-time from computer to computer or mobile device to mobile device. These streams are typically lower-quality to allow higher speed transmission, favoring throughput and lower latency over image quality. Still, these types of services offer streaming on-demand from unknown locations, using wildly varying bandwidths and latencies. These real-time services are designed to be more robust in response to such varied and unpredictable systems, typically at the expense of image quality.

More recently, virtual reality and augmented reality have gained commercial traction. Virtual reality is the complete replacement of reality with a virtual world into which one is inserted, typically through the use of a VR headset or similarly immersive display experience. Augmented reality is more-typically a representation of the actual world, either through video or actual presence, that is "augmented" in some form through the addition of virtual individuals, objects, or experiences. Augmented reality may, for example, be a typical office setting that when viewed through the display of one's mobile device appears to include an interactive character, a game, or a waterfall, or snow falling. These and other types of experiences that add to a view of the otherwise real world are described as "augmented" reality.

In response to the rise of virtual reality and augmented reality, various experiences have been created based upon three hundred and sixty degree video or still images. These videos typically create an effective sphere of images (either still or a series of video frames) that are stitched together to form a sphere around the perspective of a viewer at that location. So, for example, a user may tour the Temple Mount in Israel by "walking through" the Temple Mount as an experience based upon a three hundred and sixty degree camera that was, itself, walked through the actual Temple Mount while recording. Thereafter, a user donning a VR headset can follow that same path and be presented with a series of still images in different locations where he or she may look around in a full sphere or through a moving video in which the individual in the VR headset is inserted so that he or she may look around the spherical images as he or she is moved from place to place based upon the choices made by the original photographer.

These types of spherical still images or video are useful, and relatively simple to create, but they do not really feel particularly interactive. In part, this is because they lack any depth information at all. One is literally within a "bubble" of images and every object represented in those images is at the same distance to a viewer's eyes. If one were to lean over, or to stoop down, the images would not alter, there would be no parallax, and the image would effectively be the same. Despite the positive aspects of this technology, this lack of depth information contributes to the feeling of not being in the location and breaks immersive experience.

In contrast, the assignee of this patent has created a system for creating "volumetric video" which is video that includes depth information. That system may be better understood with reference to U.S. Pat. No. 9,369,689 and its related patents. In short, a similar filming process is used, but depth data from a LIDAR or other depth sensor is incorporated so as to generate three-dimensional models for at least some of the objects within a filmed scene. As a result, a user experiencing a scene filmed in this way may "look under" or move his or her head around to obtain different perspectives on objects. Parallax is maintained. Though the scenes are presented as video, the video is attached to the objects that have actual three-dimensional volume within the space so as to create a much more immersive experience for a viewer.

As used herein, the phrase "volumetric video" means live-action, 4 pi steradian video of a real-life scene that incorporates at least one object having a unique depth, other than the horizon depth, that is captured in three-dimensions, according to depth data captured during the creation of the volumetric video. Volumetric video expressly excludes spherical video including only a single depth (e.g. the sphere of stitched-together images) or that lacks any three-dimensional depth information for any object within the scene.

As can probably be expected, the resulting data to store the three-dimensional shapes and associated high-definition video for the scene is huge. There can be numerous objects in a scene, along with a very high-definition spherical video for that scene, along with where each piece of video should be superimposed (e.g. matching the video of a moving individual in a scene with the three-dimensional model of that individual within the scene) in addition to other data. This presents several potential problems.

First, the data is so large that it is not easily stored on computing devices of relatively small storage space. So, for example, under current technology, mobile devices such as Apple®'s iPhone® or mainstream Android® devices such as the Samsung® Galaxy 58® are incapable of storing volumetric video of any real length.

One approach would be to stream the necessary data to a phone as-needed. Similarly, the data is so large that it may be difficult to process it on devices lacking in very fast processing power. So, mobile devices like those described above are typically incapable of rendering, in real-time (e.g. more than 30 or 60 frames per second) volumetric video. So, even if the data were merely streamed, it only solves a portion of the associated problems. Yet, users still desire access to highly immersive virtual reality and augmented reality experiences in volumetric video.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Referring now to

Figure 1:
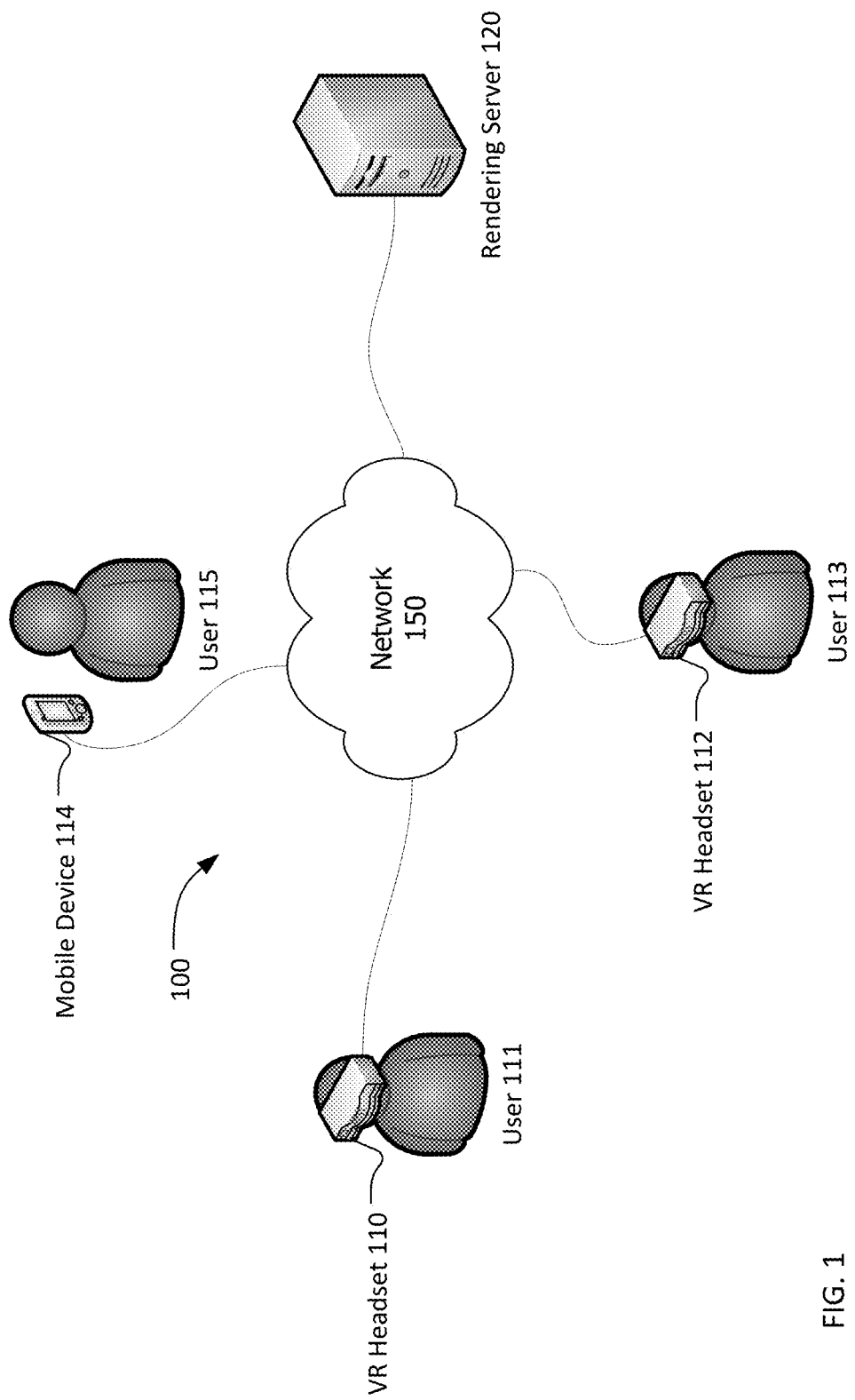
FIG. 1 is a block diagram of a system for streaming volumetric video for six degrees of freedom virtual reality.

FIG. 1 is a block diagram of a system 100 for streaming volumetric video for six degrees of freedom virtual reality. The system 100 includes VR headsets 110 and 112, mobile device 114, along with the rendering server 120, all of which are interconnected by a network 150. Also shown are users 111, 113, and 115. The users 111, 113, and 115 are shown for example purposes, but are not a part of the system 100.

The VR headsets 110 and 112, and mobile device 114 are devices including at least a display for viewing virtual reality content (e.g. three-dimensional content whose view is altered as positional data is received to adjust to movements so as to present the three-dimensional content from the altered perspective). VR headsets 110 and 112 and mobile device 114 may each be stand-alone devices such as mobile devices like mobile phones and tablets offered by companies such as Apple® and Google® Android® devices that are hand-held and stand alone or that are placed within a headset like the Google® Daydream® or Cardboard® or the Merge® headset. Alternatively, the VR headsets 110 and 112 and mobile device 114 may be tethered to a more-powerful computing device, such as a personal computer that provide rendering and data communication capabilities for the VR headsets 110 and 112 and mobile device 114.

In the case of hand-held mobile devices or a mobile device VR headset, the mobile device incorporates a display, at least one processor, memory, motion sensors such as a gravitometer, and one or more gyroscopes. The mobile device may also include one or more back-facing cameras, depth sensors, LIDAR, infrared cameras or similar functionality that may be used to detect motion or head position. An external camera, LIDAR, infrared camera, or other external sensor may also be used to provide outside-in positional and motion data for the VR headset.

In the case of the VR headsets 110 and 112 and mobile device 114 being tethered to a more-powerful computing device such as a personal computer, the VR headset may or may not have its own processor or memory, but will at least include one or more motion sensors and a display. The more-powerful computing device may be connected, wired or wirelessly to an external camera, infrared camera, LIDAR or other depth or motion sensing device for tracking the VR headset 110, 112, and 114 position, orientation, and motion.

Though the VR headsets 110 and 112 and mobile device 114 are described as VR headsets, they may, in fact, simply be a display for VR or AR content. For example, a tablet computer or mobile phone can act as a display that shows VR or AR content including volumetric video. In cases like this the display devices themselves differ little from actual VR headsets, but are merely not attached to a wearer's head. Instead, a user may hold the device up as somewhat of a portal to the world being viewed. It may still track motion, position and all the similar characteristics, while not affixed to a user's head. Examples of such devices include Google®'s Project Tango devices, more recent Google® Pixel® phones and Apple® iPhones incorporating ARKit functionality.

The rendering server 120 is a computing device that is responsible for rendering the volumetric video and transmitting it, via the network 150, to one or more of the VR headsets 110 and 112 and mobile device 114. The rendering server 120 is shown as a single server, but may be or include a cloud-based, scalable infrastructure of multiple servers. The servers may be located in physical proximity to one another or may be spread around the world to better serve VR headset users in various locations with lower latency. The rendering server 120 (or servers) may include multiple graphics processing units (GPUs) to aid in simultaneous rendering of multiple sets of volumetric video at once for various environments experienced by VR headset users. Likewise, multiple central processing units (CPUs) may be used to orchestrate rendering for multiple VR headset users.

The rendering server 120 may be provided by one or more third party solutions for streaming video or a specialized service for both rendering volumetric video and streaming. The streaming solutions that are common today typically attempt to push streaming computing and transmission capabilities to the "edge" of the network so that they are as close as possible to the end user. This may me co-locating the rendering server 120 (or servers) as near as possible to an individual home or business where much use of the rendering server 120 is taking place. For example, services such as Netflix® place streaming servers, often their own streaming servers, at the head-end of a cable provider network. The "head-end" in this case being the last network "hop" before network traffic is dispersed to individual's homes or businesses. The rendering server 120 may, preferably, be at this last hop as well because this will serve to lower overall latency and response times for the rendering server 120.

The rendering server 120 includes an operating system and other, specialized software for accepting positional and orientational tracking data from one or more VR headsets 110 and 112 and mobile device 114; and for rendering an associated view of volumetric video in response. The rendering server 120 may then transmit the view, as a video frame, to an associated one of the VR headsets 110 and 112 and mobile device 114.

The network 150 is a system that interconnects the rendering server 120 and the VR headsets 110 and 112 and mobile device 114. The network 150 may be or include the internet. The network 150 may rely upon wireless networks such as 802.11x "WiFi" networks or a Bluetooth® network. For example, the VR headset 110 may be a mobile telephone which includes an 802.11x modem and a cellular modem. In situations in which 802.11x wireless is available, it may be preferred to long-term evolution (LTE") cellular data. This may be, in part, because cellular infrastructure is typically more latency and lower throughput than 802.11x. In contrast, VR headset 112 may be a VR headset that is tethered to a local computing device with a wired Ethernet connection to a router that connects to the internet. In such a case, the VR headset 112 may prefer the available Ethernet connection for further improved latency and bandwidth throughput. The network 150 is or may be a mixed environment, using multiple technologies and protocols, depending on the particular implementation.

Figure 2:
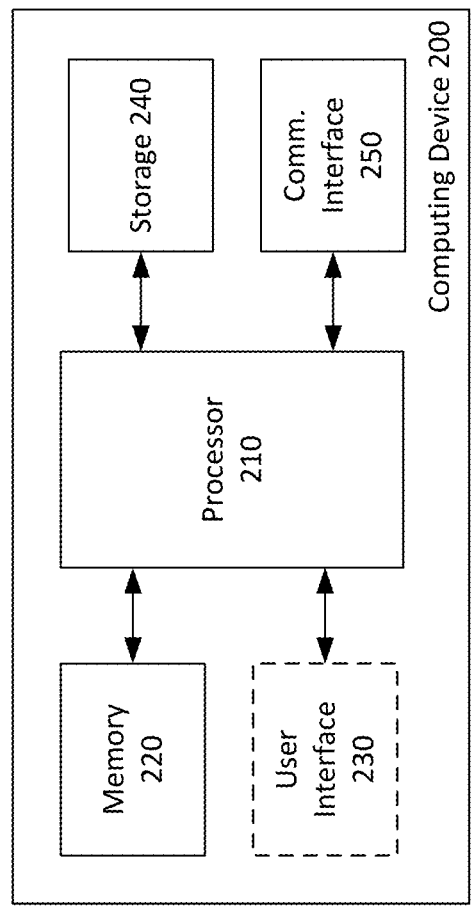
FIG. 2 is a block diagram of a computing device.

Turning now to FIG. 2, is a block diagram of an exemplary computing device 200, which may include the server 120 of FIG. 1. Similarly, the VR headsets 110, 112, and 114 may include or may have access to (e.g. a tethered computer) a computing device 200. As shown in FIG. 2, the computing device 200 includes a processor 210, memory 220, optionally, a user interface 230, storage 240, and a communications interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a system-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory. The processor 210 may be multiple processors, each with independent functionality such as a CPU and a GPU and any number of co-processors for specialized functions. Likewise, the processor 210 may be multi-core with some processors being highly-efficient, while others are highly specialized or powerful. The processor (or a sub-processor) may include specialized registers, high-speed cache, or other specialized hardware or software to perform functions such as rendering video, generating three-dimensional worlds represented by the volumetric video, encoding or decoding video or audio and other, similar, specialized functions.

The memory 220 may temporarily or permanently store software programs and routines for execution by the processor. These stored software programs may include an operating system software. The operating system may include functions to support the communications interface 250, such as protocol stacks, encoding/decoding, compression/decompression, rendering, and encryption/decryption. The stored software programs may include an application or "app" to cause the computing device to perform portions of the processes and functions described herein. The word "memory", as used herein, explicitly excludes propagating waveforms and transitory signals.

The user interface 230, if present, may include a display and one or more input devices such as a touch screen, keypad, keyboard, stylus or other input devices. The user interface 230 may use the display to present user interfaces to an operator or other user of the computing device 200.

Storage 240 may be or include non-volatile memory such as hard disk drives, flash memory devices designed for long-term storage, writable media, and proprietary storage media, such as media designed for long-term storage of photographic or video data. The word "storage" as used herein explicitly excludes propagating waveforms and transitory signals The communications interface 250 may include one or more wired interfaces (e.g. a universal serial bus (USB), high definition multimedia interface (HDMI)), one or more connectors for storage devices such as hard disk drives, flash drives, or proprietary storage solutions. The communications interface 250 may also include a cellular telephone network interface, a wireless local area network (LAN) interface, and/or a wireless personal area network (PAN) interface. A cellular telephone network interface may use one or more cellular data protocols. A wireless LAN interface may use an 802.11x WiFi® wireless communication protocol or another wireless local area network protocol. A wireless PAN interface may use a limited-range wireless communication protocol such as Bluetooth®, Wi-Fi®, Zig-Bee®, or some other public or proprietary wireless personal area network protocol. The cellular telephone network interface and/or the wireless LAN interface may be used to communicate with devices external to the computing device 200.

The communications interface 250 may include radio-frequency circuits, analog circuits, digital circuits, one or more antennas, and other hardware, firmware, and software necessary for communicating with external devices. The communications interface 250 may include one or more specialized processors to perform functions such as encoding/decoding, compression/decompression, and encryption/decryption as necessary for communicating with external devices using selected communications protocols. The communications interface 250 may rely on the processor 210 to perform some or all of these function in whole or in part.

As discussed above, the computing device 200 may be configured to perform geo-location, which is to say to determine its own location. Geo-location may be performed by a component of the computing device 200 itself or through interaction with an external device suitable for such a purpose. Geo-location may be performed, for example, using a Global Positioning System (GPS) receiver or by some other method.

Figure 3:
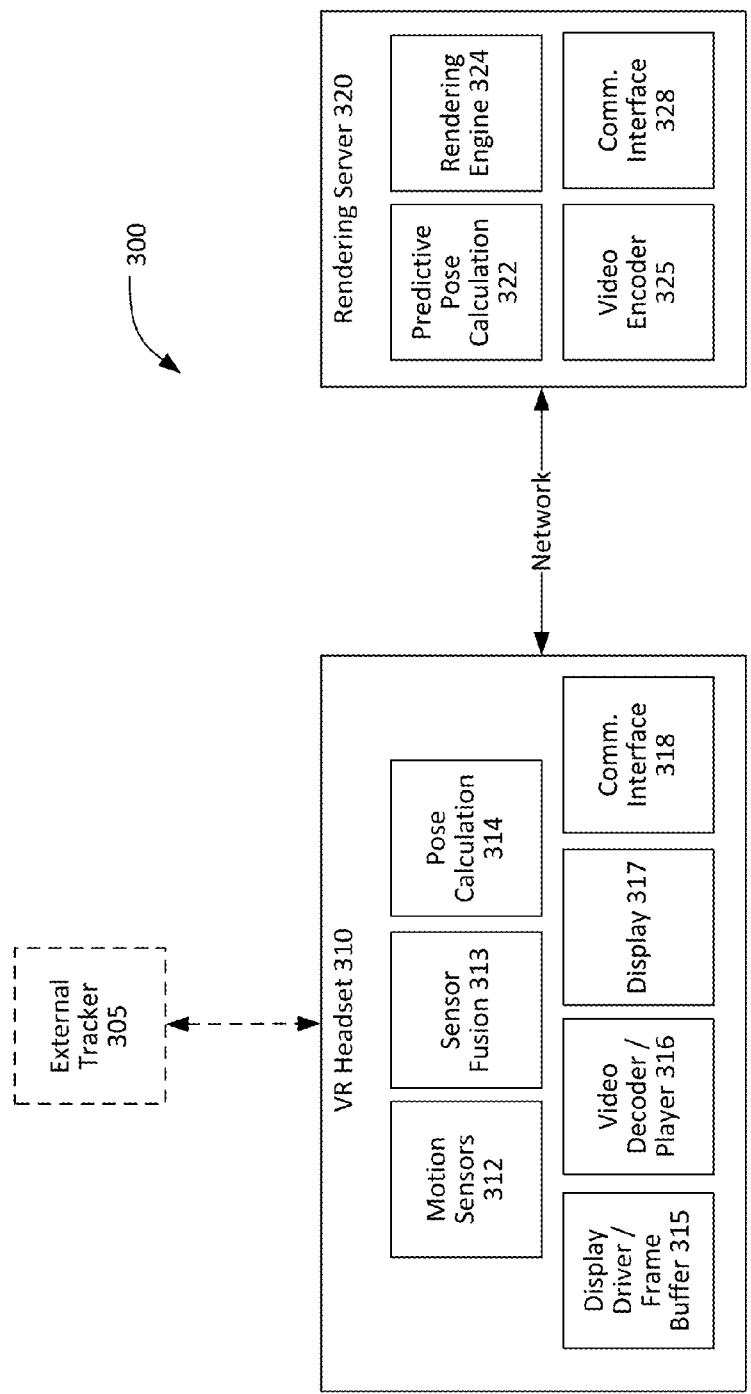
FIG. 3 is a functional diagram of a system for streaming volumetric video for six degrees of freedom virtual reality.

FIG. 3 is a functional diagram of a system 300 for streaming volumetric video for six degrees of freedom virtual reality. The system 300 includes VR headset 310 and rendering server 320 along with the optional external tracker 305.

The VR headset 310, which may be the same as VR headset 110 in FIG. 1, includes one or more motion sensors 312, sensor fusion 313, pose calculation 314, a display driver/frame buffer 315, video decoder/player 316, a display 317, and a communications interface 318.

The motion sensors 312 are sensors used to detect changes in position of the VR headset 310. These motion sensors 312 may be or include gyroscopes, gravitometers, cameras, LIDAR, infrared camera and projector combinations, and other, similar, sensors. These motion sensors 312 generate raw data that may be used to estimate or accurately gauge the position of the VR headset 310.

The optional external tracker 305 may provide additional positional, motion, or orientational data. One example of an external tracker 305 is simply a video camera. Other examples are infrared cameras in combination with infrared markers on a VR headset 310. Still other eternal trackers 305 could be infrared camera and projector combinations that map locations in manners similar to the Microsoft® Kinect®. This type of tracking is generally referred to as outside-in tracking. This type of tracking provides some benefits, namely, including a fixed location (e.g. the location of the external tracker 305) from which the VR headset 310 may be observed. The tracking is fairly accurate, but has the drawback of additional calibration being required and having to ensure communication with the external tracker 305 and the VR headset 310 or rendering server 320. If an external tracker 305 is used, its data may be used in conjunction with any other data from the motion sensors 312.

The sensor fusion 313 is software, operating on the VR headset 310 (or on a tethered computing device) that combines the output from the motion sensors 312 to generate positional and orientation data that may be used by software associated with the VR headset 310 or other computing devices to generate a virtual reality environment according to the indicated position and orientation data. For example, as a user's head turns, the VR motion sensors 312 and sensor fusion 313 may create raw motion data that may be used to create pose data to enable virtual reality environment software (e.g. a game or other environment) to update a display 317 of the VR headset 310 to correspond to the user's head turning. In this way, virtual environments mirror the visual appearance of real environments by responding to physical movement in much the same way. This data may also include indicia of the current motion (e.g. a vector) and any acceleration or deceleration and any ongoing rotation about an axis.

Sensor fusion 313 may incorporate algorithms for selecting particular sensor data from the motion sensors 312 over other data if such data is generally of higher quality or more-likely to be correct. Similarly, sensor fusion 313 may intelligently combine motion data from the various motion sensors 312 in such a way as to generate the most likely position and orientation for the VR headset 310.

The pose calculation 314 may generate a mathematical model for a user's head position and orientation from the fused orientation and positional data. This model may be described as "pose data" as used herein. The pose data includes at least two components. First, the pose data includes an (x, y, z) coordinate pose representing the position of the "viewer" in the three-dimensional space—in this case, the volumetric video. Second, the pose data includes an (x, y, z, w) quarternion data that represents the rotation or rotations, if any, of the "viewer" in the three-dimensional space.

The pose data may be substantially smaller in size than raw sensor data such that pose data may be provided to other software for use in generating three-dimensional worlds from that pose data. The model generated as pose data may also include representations of any ongoing rotation, any velocity and any acceleration or deceleration of any movement or rotation.

The pose data may be transmitted to the rendering server 320 using the communications interface 318 for actual rendering. This is discussed more below and with reference to FIG. 4.

The display driver/frame buffer 315 receives instructions from a processor operating software to display a particular data set. A frame buffer may be employed to pre-render one or more frames of video. In a typical VR headset 310, three-dimensional VR environments are stored, rendered, and delivered to the display driver/frame buffer 315 all on the VR headset 310 or on a physically connected computing device. This is not the case here.

Instead, the communications interface 318 receives fully-rendered frames of video for display and passes those to the display driver/frame buffer. Preferably, the frame buffer may be disabled altogether or eliminated such that the delivered frames of video are rendered as quickly as possible. Frame buffers operate well for streams of video content that is fixed, sequential, and unchanging. They enable video to be queued before it is displayed on the display 317 to enable a bit of a cushion for potential latency or bandwidth limitations. However, when volumetric video is being rendered remotely, because it is positional and motion-related in nature, it should be delivered as quickly as possible. As such, any available frame buffer may be eliminated or not used.

Video frames received via the communications interface 318 are encoded for compact transmission. The video decoder/player 316 decodes those frames and plays them for the display 317. In modern, compressed video standards, only pixels on a display that will be changed are updated. There may be periodic "key" frames which rewrite the entire display, but otherwise, the actual change from frame to frame of video is, typically, very small when the video is displayed at 30 frames per second or faster. Preferably, here, the stream of video is 60 frames per second or faster, though latency between the rendering server 320 and VR headset 310 may reduce this number.

As should be understood, the VR headset 310 in this system 300 does not do any rendering at all. Instead, it receives a stream of video content that is representative of the volumetric video that was rendered by the rendering server 320 and displays it as quickly as possible on the display 317. The operation of the rendering server 320 is discussed below.

The rendering server 320, which may be the same as the rendering server 120 in FIG. 1, includes predictive pose calculation 322, a rendering engine 324, a video encoder 325, and a communications interface 328.

The rendering server 320 receives the pose data from the VR headset 310 and uses the rendering engine 324 to generate a frame of video from a volumetric video including texture information, video data, and three-dimensional information for a scene. The volumetric video itself may be stored locally to or may be quickly accessible by the rendering server 320. The pose data from the VR headset 310 is used to select the location from which a viewer is viewing the volumetric video. The associated position within the volumetric video may be ascertained from that pose data. The rendering engine 324 continually receives additional pose data and renders each additional video frame for transmission back to the VR headset 310 via the communications interface 328.

The predictive pose calculation 322 is functionality that likewise receives the pose data and makes a small projection in time to the next video frame. This prediction is based upon the present pose data and the velocity, acceleration or deceleration, and rotation of the VR headset 310 derived from the most-recent pose data. There is inherently some latency in communication and in when the next video frame will actually be received by the VR headset 310 and displayed. Therefore, the predictive pose calculation 322 may project a small time into the future based upon the time the pose data was generated by the VR headset 310.

The predictive pose calculation 322 may also detect latency in the communication using a time stamp associated with the pose data and compared with a current time on the rendering server 320. This latency may primarily be network latency, but may include other latency inherent in the process such as the actual process of obtaining the data from the motion sensors 312 and performing sensor fusion 313. The latency may also take into account the time required to transmit any video frames back and to cause them to be displayed on the VR headset 310 (or other display device).

The latency may vary from display device to display device. For example, one VR headset 310 may be very close to the rendering server 320, with a latency on the order of 100 milliseconds. Another VR headset 112 (or other mobile device) may be further from the rendering server 320 with a latency of approximately 300 milliseconds. In order to maintain a steady stream of video frames at a rate of, preferably, 60 frames per second, any pose data received may be relied upon and used for prediction for all frames between each receipt of new pose data.

The number of poses required to be used for rendering one or more video frames may be calculated multiplying the number of frames per second by the latency (in milliseconds) and rounding up to the nearest integer. So, if in the time it takes to receive new pose data, two frames of video should have been displayed on the VR headset 310, then two frames of video will be rendered. In general, this process "rounds up" in predictive poses to render more frames rather than fewer frames to accommodate any latency.

So, for our example of a VR headset 310 with latency of 100 milliseconds, a total of two poses may be predicted by the predictive pose calculation 322 for two, distinct video frames. For another VR headset 112 (or other display device) with a latency of 300 milliseconds, three or four poses may be predicted by the predictive pose calculation 322 for three or four, distinct video frames. In this way, whatever the latency, video frames will continue to be transmitted to the VR headset 310 for display.

Because the rendering server 320 is operating in such small time-frames (approximately 60 frames per second), the overall movement is quite small from frame to frame of associated video. As a result, these micro-predictions can be quite accurate in most cases. And, this enables the rendering engine 324 to pre-render the next (or a series of next) frames of video based upon a predicted pose data generated with reference to the actual pose data. Because the frame rate is so high and further pose data is received so often (typically, also 60 pose data per second) any errors may be corrected almost immediately. Most errors, if any exist, are barely perceptible by the human eye and are immediately corrected in the next frame of video based upon new pose data. Ideally, this will happen several times a second, but may be intermittently delayed due to network congestion or other issues.

Upon receipt of the next pose data from the VR headset, the predictive pose calculation 422 may predict a pose at an extremely small time-differential based upon an expected rendering time by the rendering server 320 in addition to an expected transmission time to the VR headset 310 (ideally, very small) and any time required to display a rendered frame of video on the display 317 of the VR headset 310. All of these times are very small, on the order of tiny fractions of seconds. Still, the predictive pose calculation may take these tine time frames into account when predicting pose data that will be used for rendering.

The rendering engine 324 uses the predicted pose data to render a next frame of video for the volumetric video. As used herein, a frame of video means a two-dimensional video that is encoded in a form suitable for display on at least one screen and, potentially, upon two screens or divided into two distinct display areas, one for each eye of a VR headset 310 wearer.

The benefit of this process is primarily that the rendering engine 324 may be in near constant operation rather than always waiting on the next set of pose data from the VR headset 310 before beginning the process of rendering the next video frame. The rendering engine 324 and predictive pose calculation 323 both now have new pose data associated with the immediately-last frame so that they may, as before, pre-render the next frame before the next set of pose data arrives. This process enables the video frames to be rendered—which is the most computationally intensive aspect of the overall process—while awaiting the next set of pose data.

The video encoder 325 may be a relatively standard video encoder using MPEG-4 and/or H.264 or H.265 video encoding processes to encode a frame of video that shows the volumetric video as it would appear were it to be rendered by the VR headset 310. Because the algorithms and processes for encoding, compressing, and efficiently transmitting sequential frames of encoded video are relatively robust, the transmission of this type of data is substantially less latency and bandwidth intensive than sending the actual volumetric video, three-dimensional models, and associated textures (also video) over the same network connections. So, in this way, the rendering and storage requirements are offloaded to specialized hardware and software on the rendering server 320, without degrading the overall quality of the experience for the user of the VR headset 310.

Description of Processes

Figure 4:
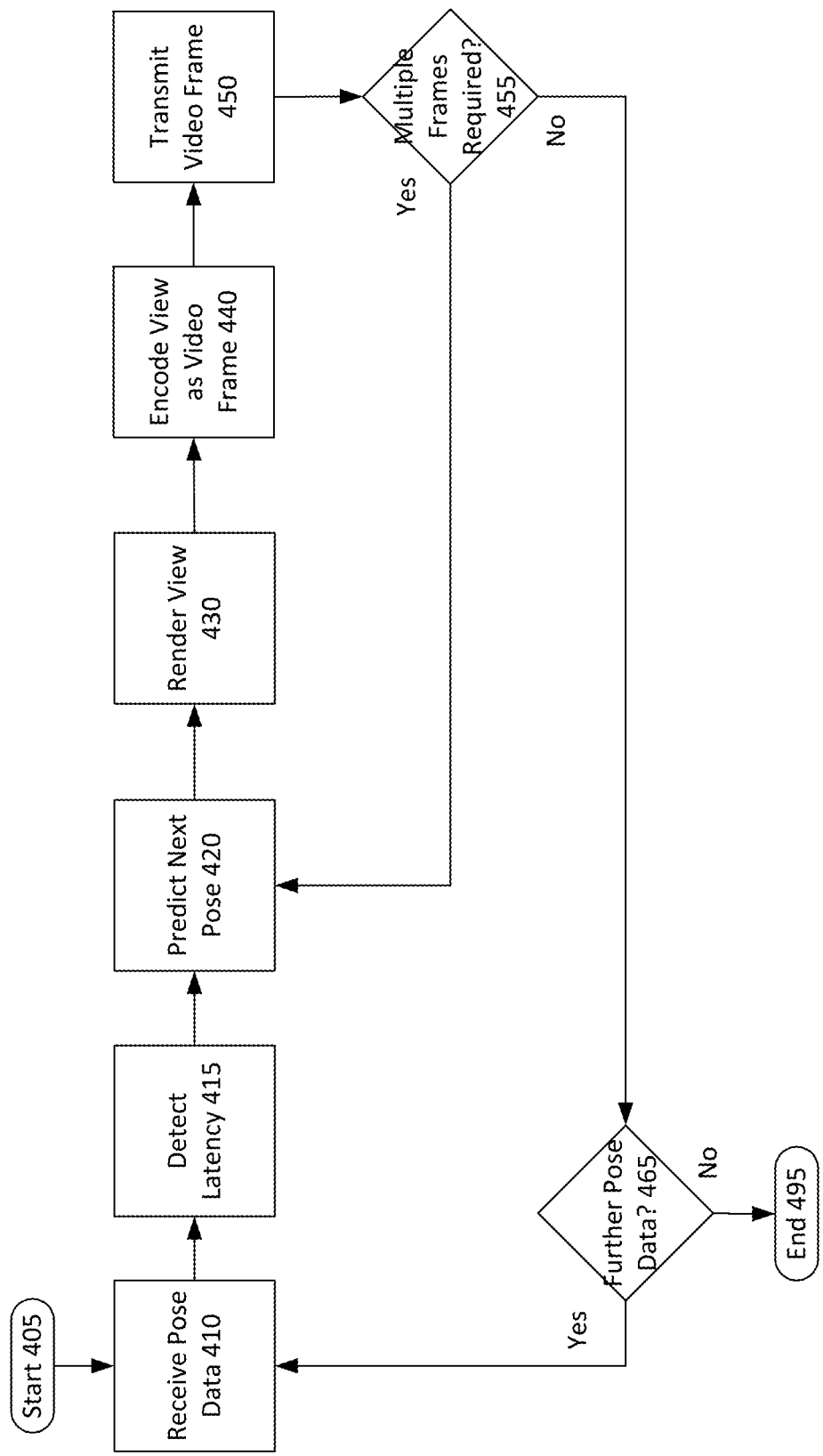
FIG. 4 is a flowchart for a method of streaming volumetric video for six degrees of freedom virtual reality from the perspective of the rendering server.

Referring now to FIG. 4, a flowchart for a method of streaming volumetric video for six degrees of freedom virtual reality from the perspective of the rendering server. The flow chart has both a start 405 and an end 495, but the process is cyclical in nature so long as the associated VR headset 310 is continuing to operate by transmitting pose data, the rendering server 320 will render video frames from volumetric video and transmit those frames to the VR headset 310.

Following the start 405, the rendering server 320 receives pose data at 410. The pose data describes the position, orientation, and any movement of the VR headset 310. As discussed above, this pose data includes (x, y, z) coordinate data and (x, y, z, w) quarternion data. The pose data may include or be used to derive velocity, rotational velocity, and an indication of whether or not a particular angular or rotational velocity are increasing or decreasing and at what rate. The pose data may include a time stamp of when it was created or transmitted via the network.

Once the pose data is received, an associated latency is calculated, typically reliant upon the time stamp associated with the pose data. This latency may be used to determine how many, if more than one, predicted poses should be calculated and how many frames of video should be rendered.

Next, a predicted next pose is calculated at 420. The predictive pose calculation 322 may use this pose data and a known time-stamp for that data in conjunction with a measure of the latency between the VR headset 310 and rendering server 320 to select a future time for generating predicted pose data. That predicted pose data may extrapolate, mathematically, from the actual pose data to a time in the very near future when the resulting frame may be displayed on the VR headset.

The rendering server 320 may render the view at 430 that is derived from the predicted pose data. This rendering includes, at least, converting the predicted pose data into a position, orientation, and view within the volumetric video, then generating a three-dimensional view of the volumetric video based upon the predicted pose data. The view may be thought of as a "window" into the volumetric video world. The window includes all that an individual actually standing in that position would see, including any occlusions textures, and objects.

Next, the view is encoded as a video frame at 440. To simplify the transmission of the view, it is rendered as a frame of actual, two-dimensional video. Various encoding techniques may be employed to compress the video frame for transmission. And, in some cases, to speed compression and transmission, systems such as forward error correction (FEC) may be disabled. Or, FEC may be explicitly enabled and used to deal with errors in transmission of various frames because, as discussed below, the system may rely upon user datagram protocol ("UDP") for transmission which does not guarantee delivery. As a result, packets may be lost and FEC may provide a way to recover gracefully from one or more lost packets with relatively limited computational load on the VR headset 310.

Next, the video frame is transmitted at 450. This transmission may rely upon "lossy" protocols like UDP that do not guarantee delivery of each packet making up the frame. But, UDP makes up for this limitation with the use of FEC to recover form missing packets and, beneficially, provides greater throughput for the transmission of the video frames. Rather than ensure that the last video frame was "perfect," generally streaming of video prefers to simply ensure that the next frame is as good as possible. As long as the frames continue to quickly arrive, the user experience is, overall, more positive than a slow, perfect transmission. This is especially true when experiencing the frames as a virtual environment due to issues of motion sickness growing with increased latency. Generally speaking, throughput is more important than perfection in volumetric video. As a result, compression techniques that lower overall quality but ensure continued display may also be preferred (e.g. lowering the resolution).

Finally, based upon the detected latency at 415, a determination is made whether multiple frames of video must be generated based upon the latency at 455. If so, then a new predicted pose for the next frame of video (e.g. frame 2 of 60 frames per second) is predicted at 420, with a view rendered for that predicted pose at 430, video encoded as a video frame at 440 and the predicted video frame transmitted at 450. If still more frames of video are required ("yes" at 455) in order to address the latency, then the process begins for a new predicted pose (e.g. for frame 3 of 60 frames per second) at 420 and so on.

If multiple frames are no longer required ("no" at 455) meaning that (1) either the latency makes 1 to 1 pose data to frame transmission possible or (2) that the prediction need not continue because new pose data is or will very soon be received, then the process determines whether new pose data has been received at 465.

If further pose data is received ("yes" at 465) from the VR headset 310, then the process begins again with the receipt of that pose data at 410. As with the first pose data, a predicted pose data may be generated therefrom to speed the overall process of rendering and encoding. If no further pose data is received ("no" at 465), meaning that the VR headset 310 or other display device has stopped transmitting pose data, then the process ends at 495.

Figure 5:
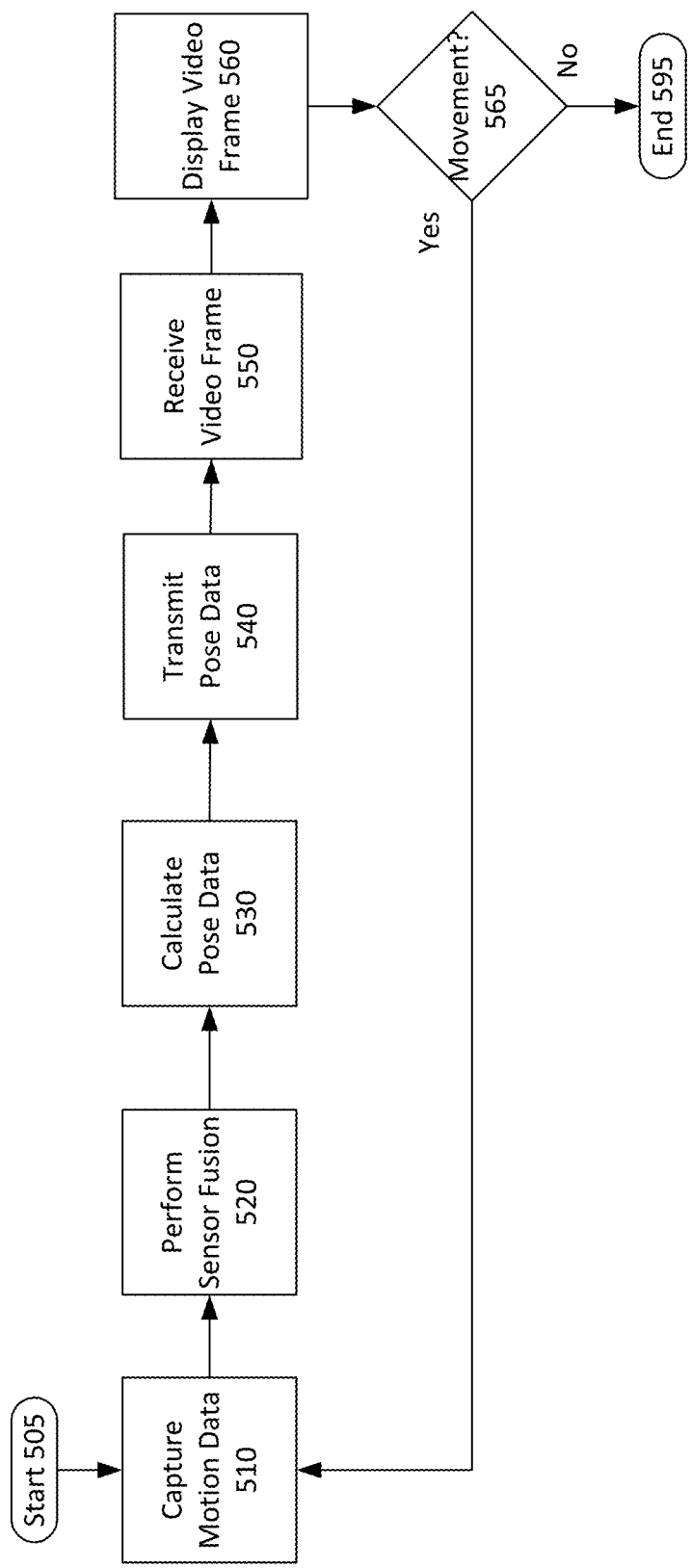
FIG. 5 is a flowchart for a method of streaming volumetric video for six degrees of freedom virtual reality from the perspective of the virtual reality headset.

Turning to FIG. 5, a flowchart for a method of streaming volumetric video for six degrees of freedom virtual reality from the perspective of the virtual reality headset.

First, motion data is captured at 510. This data is captured by the motion sensors 312 and, optionally, external tracker 305. Once the actual raw data is captured, sensor fusion is performed at 520. Sensor fusion results in the weighted or otherwise selective combination of the raw sensor data into the most-likely data indicating the position, orientation, rotation, and any movement of the VR headset 310.

Next, the pose data is calculated at 530. This pose data is a mathematical model of the raw sensor data that is compact for easy transmission to the rendering server 320. That pose data is transmitted to the rendering server 320 at 540.

The VR headset 310 then awaits a video frame for the pose data it just transmitted.

The VR headset 310 then receives a video frame at 550. This video frame corresponds to the pose data that was just transmitted at 540. However, the VR headset 310 may be configured so as to simply display whatever video frame it receives as a part of an overall system for speeding rendering and display on the VR headset 310 to lower latency. So, the video frame is displayed at 560. In cases in which latency is high between the VR headset 310 and the rendering server 320, multiple frames may be received at 550 and displayed at 560 before further motion data is captured and transmitted to the rendering server. The VR headset 310 will display any video frame it receives.

Next, a determination whether there is additional motion still going on with the VR headset is made at 565. If there is not ("no" at 595), then the process ends at 595. If there is still movement ("yes" at 565), then the process begins again with the capture of that motion data using the motion sensors 312 and, optionally, the external tracker 305.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for streaming of volumetric three-dimensional video comprising:
   a rendering server configured to:
      receive, via a network, pose data describing an (x, y, z) coordinate position within a three-dimensional virtual environment for a display device along with (x, y, z, w) quaternion data describing three-dimensional spatial rotation within the three-dimensional environment;
      detect a network latency between the rendering server and the display device using a time-stamp applied to the pose data;
      determine that the network latency is greater than one pose data per one frame of video;
      calculate a series of predicted poses based upon the pose data, each of the series of predicted poses usable to render and encode one of a series of frames of video, each of the series of frames of video at a later time than a preceding frame of video from the series of frames of video for a time when an image rendered by the rendering server is likely to be received and displayed by the display device;
      render each of a series of predicted views of the three-dimensional virtual environment for the display device using each of the series of predicted poses;
      encode each of the series of predicted views as one of the series of frames of video; and
      transmit each of the series of frames of video before any additional frame of video is transmitted based upon a second pose data received from the display device.

2. The system of claim 1 wherein a total number of the series of predicted poses is calculated based upon a relative latency of the network latency compared to a framerate for a video made up of the series of frames of video.

3. The system of claim 1 wherein the display device is one of a head-worn display device and a mobile device.

4. The system of claim 1 wherein the rendering server is made up of a plurality of servers that are automatically scalable based upon demand from display devices providing pose data and requesting rendered frames of video.

5. The system of claim 1 further comprising:
   the display device configured to:
      generate the pose data using one or more motion sensors;
      transmit the pose data to the rendering server;
      receive the frame of video; and
      display the frame of video on the display.

6. The system of claim 5 wherein the received frames of video are immediately displayed without any buffering.

7. A method for streaming volumetric three-dimensional video comprising:
   receiving pose data describing an (x, y, z) coordinate position within a three-dimensional virtual environment for a display device along with (x, y, z, w) quaternion data describing three-dimensional spatial rotation within the three-dimensional environment;
   detecting a network latency between the rendering server and the display device using a time-stamp applied to the pose data;
   determining that the network latency is greater than one pose data per one frame of video;
   calculating a series of predicted poses based upon the pose data, each of the series of predicted poses usable to render and encode one of a series of frames of video, each of the series of frames of video at a later time than a preceding frame of video from the series of frames of video for a time when an image rendered by the rendering server is likely to be received and displayed by the display device;
   rendering each of a series of predicted views of the three-dimensional virtual environment for the display device using each of the series of predicted poses;
   encoding each of the series of predicted views as one of the series of frames of video; and
   transmitting each of the series of frames of video before any additional frame of video is transmitted based upon a second pose data received from the display device.

8. The method of claim 7 wherein a total number of the series of predicted poses is calculated based upon a relative latency of the network latency compared to a framerate for a video made up of the series of frames of video.

9. The method of claim 7 wherein the display device is one of a head-worn display device and a mobile device.

10. The method of claim 7 wherein the rendering server is made up of a plurality of servers that are automatically scalable based upon demand from display devices providing pose data and requesting rendered frames of video.

11. The method of claim 7 further comprising:
    generating the pose data using one or more motion sensors;
    transmitting the pose data to the rendering server;
    receiving the frame of video; and
    displaying the frame of video on the display.

12. The method of claim 11 wherein received frames of video are immediately displayed without buffering.

13. Apparatus comprising non-transitory storage medium storing a program having instructions which when executed by a computing device will cause the computing device to stream three-dimensional video, the instructions of the program for:
    receiving pose data describing an (x, y, z) coordinate position within a three-dimensional virtual environment for a display device along with (x, y, z, w) quaternion data describing three-dimensional spatial rotation within the three-dimensional environment;
    detecting a network latency between the rendering server and the display device using a time-stamp applied to the pose data;
    determining that the network latency is greater than one pose data per one frame of video;
    calculating a series of predicted poses based upon the pose data, each of the series of predicted poses usable to render and encode one of a series of frames of video, each of the series of frames of video at a later time than a preceding frame of video from the series of frames of video for a time when an image rendered by the rendering server is likely to be received and displayed by the display device;

rendering each of a series of predicted views of the three-dimensional virtual environment for the display device using each of the series of predicted poses;

encoding each of the series of predicted views as one of the series of frames of video; and transmitting each of the series of frames of video before any additional frame of video is transmitted based upon a second pose data received from the display device.

14. The apparatus of claim 13 wherein a total number of the series of predicted poses is calculated based upon a relative latency of the network latency compared to a framerate for a video made up of the series of frames of video.

15. The apparatus of claim 13 wherein the display device is one of a head-worn display device and a mobile device.

16. The apparatus of claim 13 wherein the rendering server is made up of a plurality of servers that are automatically scalable based upon demand from display devices providing pose data and requesting rendered frames of video.

17. The apparatus of claim 13 further comprising:
a processor
a memory
wherein the processor and the memory comprise circuits and software for performing the instructions.

* * * * *